UNITED STATES PATENT OFFICE.

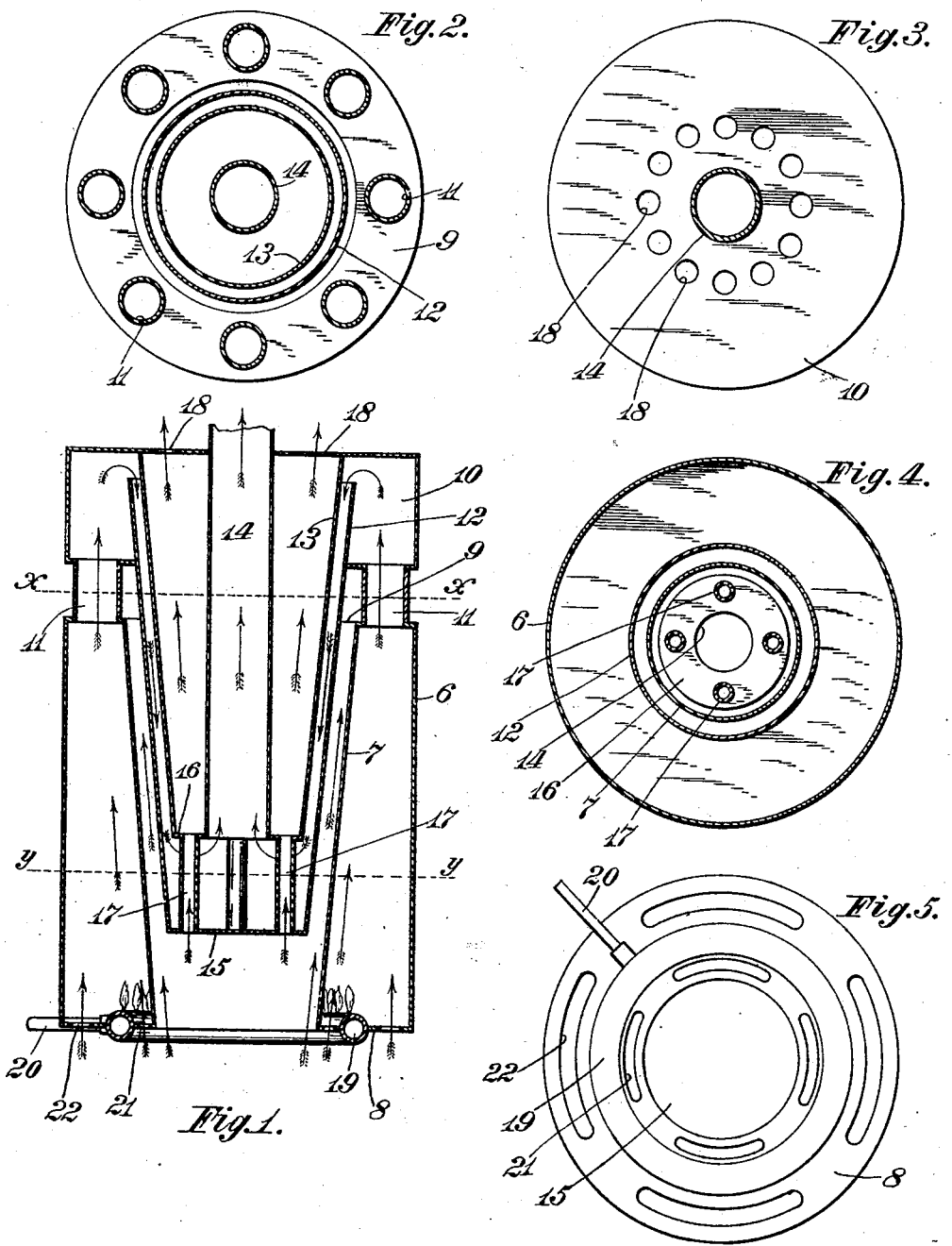

WILLIAM C. HILLIKER, OF COLUMBUS, OHIO.

GAS-CONSUMING HEATING-STOVE.

No. 910,536.

Specification of Letters Patent.

Patented Jan. 26, 1909.

Application filed October 17, 1908. Serial No. 458,255.

*To all whom it may concern:*

Be it known that I, WILLIAM C. HILLIKER, a citizen of the United States, residing at Columbus, in the county of Franklin and State of Ohio, have invented a certain new and useful Improvement in Gas-Consuming Heating-Stoves, of which the following is a specification.

The object of this invention is to provide an improved gas burning heating stove or furnace, the special aim being to provide a simple and economical construction in which extensive surfaces for the impingement of air to be heated are presented.

The invention is embodied in the example of it herein shown and described, the features of novelty being pointed out in the claims appended hereto.

In the accompanying drawings—Figure 1 is a central vertical section of the stove embodying the invention. Fig. 2 is a horizontal section on the line $x$—$x$ looking down. Fig. 3 is a plan view of the upper end. Fig. 4 is a horizontal section on the line $y$—$y$ looking up. Fig. 5 is a plan view of the lower end.

In the views like characters of reference indicate corresponding parts, and 6 designates the outer wall or shell of the combustion chamber and 7 the inner wall. The outer wall 6 is cylindrical and the inner wall is frusto-conical with the larger end uppermost. The lower and upper ends of the walls 6 and 7 are connected with ring-like walls 8 and 9 respectively. Surmounting the combustion chamber is a drum 10, the interior of which is connected with combustion chamber by short tubes 11. Connected with the lower wall of the drum 10 and projecting downward into the chamber formed by frusto-conical wall 7 is a frusto-conical wall 12 and connected with the upper wall of the drum 10 and projecting downward into the chamber formed by the wall 12 is a third frusto-conical wall 13, the three walls 7, 12 and 13 being spaced apart to permit the flow of the products of combustion or of air, as the case may and as shall presently appear.

Within the chamber formed by the wall 13 is the flue or pipe 14 for the escape of the products of combustion. The lower end of the frusto-conical wall 12 is provided with a wall 15 and the lower end of the frusto-conical wall 13 is provided with a ring like wall 16 that connects the lower ends of the pipe 14 and said wall 13, but connecting the walls 15 and 16 are tubes 17. The upper wall of the drum 10 is provided with holes 18 for the escape of heated air. The ring-like wall 8 at the lower end of the combustion chamber is provided near the wall 7 with a circular gas burner 19 supplied with fuel gas through the radial pipe 20. The wall 8 is also provided with holes 21 and 22 for the admission of air to support combustion.

Combustion at the burner sets up a flow of heated air and products of combustion through the pipes 11 into the drum 10, thence downward between the walls 12 and 13 and the pipes 17 to the escape flue 14, thus greatly heating all the interior or confined surfaces, and to a considerable extent the exterior surfaces. The air to be warmed chiefly enters the opening at the lower end of the frusto-conical chamber formed by the wall 7. Some of this air passes upward between the walls 7 and 12 and thence outward into the room between the short tubes 11, while some passes upward through the tubes 17, thence between the wall 13 and pipe 14 and through the holes 18. The air is thus warmed by heated surfaces on both or all sides of it. Air is also somewhat warmed by contact with the exterior surfaces.

What I claim and desire to secure by Letters Patent is:

1. In a gas consuming heating device, the combination of the outer wall 6 and inner wall 7 forming the combustion chamber, the drum 10 surmounting the same and communicating therewith by tubes 11, the wall 12 supported in the lower portion of said drum and extending into the chamber formed by the wall 7, the wall 13 supported in the upper portion of said drum and extending into the chamber formed by the wall 12, said walls 12 and 13 forming between them a passage for the products of combustion, the pipe 14 for carrying off the products of combustion extending into the chamber formed by the wall 13, and a gas burner for the aforesaid combustion chamber, substantially as described.

2. In a gas consuming heating device, the combination of the outer wall 6 and inner wall 7 forming the combustion chamber, the drum 10 surmounting the same and communicating therewith by tubes 11, the wall 12 supported in the lower portion of said drum and extending into the chamber formed by the wall 7, and the wall 13 supported in the upper portion of said drum and extending into the chamber formed by the wall 12, said walls 12 and 13 forming between them a passage for the products of combustion, the pipe 14 for carrying off the products of combustion extending into the chamber formed by the wall 13, tubes 17 establishing communication of the chamber between the wall 13 and pipe 14 with the external air, and a gas burner for the aforesaid combustion chamber, substantially as described.

3. In a gas consuming heating device, the combination of the outer wall 6 and inner wall 7 forming the combustion chamber, the drum 10 surmounting the same and communicating therewith by tubes 11, the wall 12 supported in the lower portion of said drum and extending into the chamber formed by the wall 7, the wall 13 supported in the upper portion of said drum and extending into the chamber formed by the wall 12, said walls forming between them a passage for the products of combustion the said walls 7, 12 and 13 being of frusto-conical form, the pipe 14 for carrying off the products of combustion extending into the chamber formed by the wall 13, and a gas burner for the aforesaid combustion chamber, substantially as described.

WILLIAM C. HILLIKER.

Witnesses:
BENJAMIN FINCKEL,
ADA G. GAMBS.